Figure 1:
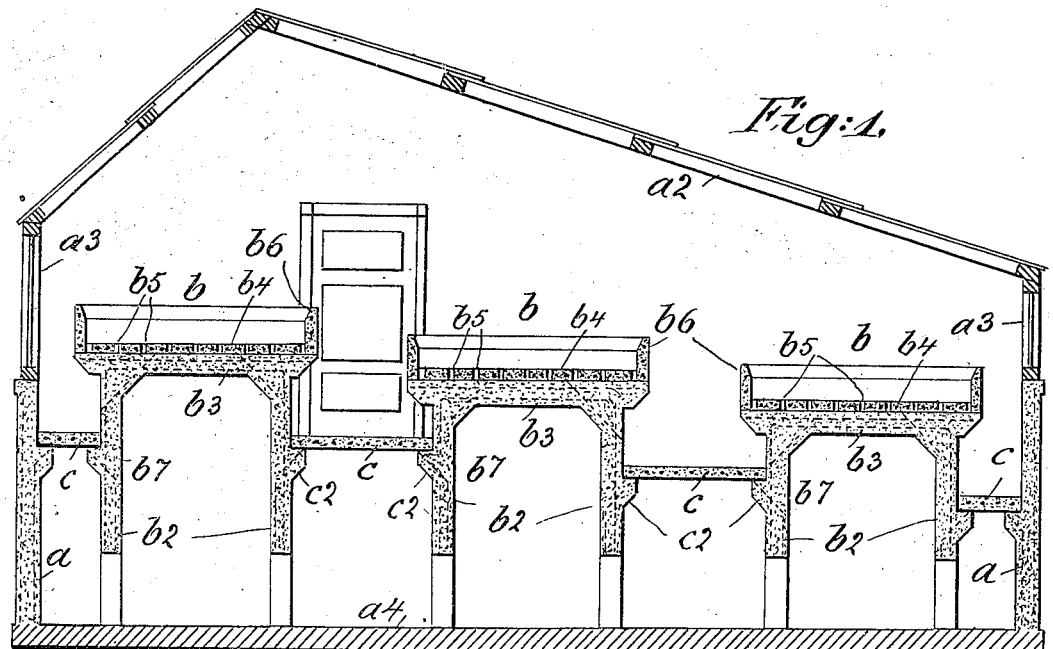

No. 838,229. PATENTED DEC. 11, 1906.
J. WILSON & S. O. HOYT.
GREENHOUSE.
APPLICATION FILED JULY 13, 1906.

WITNESSES
INVENTORS:
John Wilson,
Samuel O. Hoyt,
BY
Edgar Tate & Co
ATTORNEYS

UNITED STATES PATENT OFFICE.

JOHN WILSON, OF SHORT HILLS, NEW JERSEY, AND SAMUEL O. HOYT, OF BROOKLYN, NEW YORK.

GREENHOUSE.

No. 838,229.        Specification of Letters Patent.        Patented Dec. 11, 1906.

Application filed July 13, 1906. Serial No. 326,052.

*To all whom it may concern:*

Be it known that we, JOHN WILSON, residing at Short Hills, county of Essex, State of New Jersey, and SAMUEL O. HOYT, residing at Brooklyn, county of Kings, State of New York, citizens of the United States, have invented certain new and useful Improvements in Greenhouses, of which the following is a specification, such as will enable those skilled in the art to which it appertains to make and use the same.

This invention relates to the construction of greenhouses, and particularly to the bench-work thereof, whereby the plants are supported in the greenhouse; and the object of the invention is to provide a monolithic bench construction composed entirely of concrete reinforced with metal, so as to give the requisite strength with a minimum amount of material.

The invention is fully disclosed in the following specification, of which the accompanying drawings form a part, in which the separate parts of our improvement are designated by suitable reference characters in each of the views, and in which—

Figure 2:
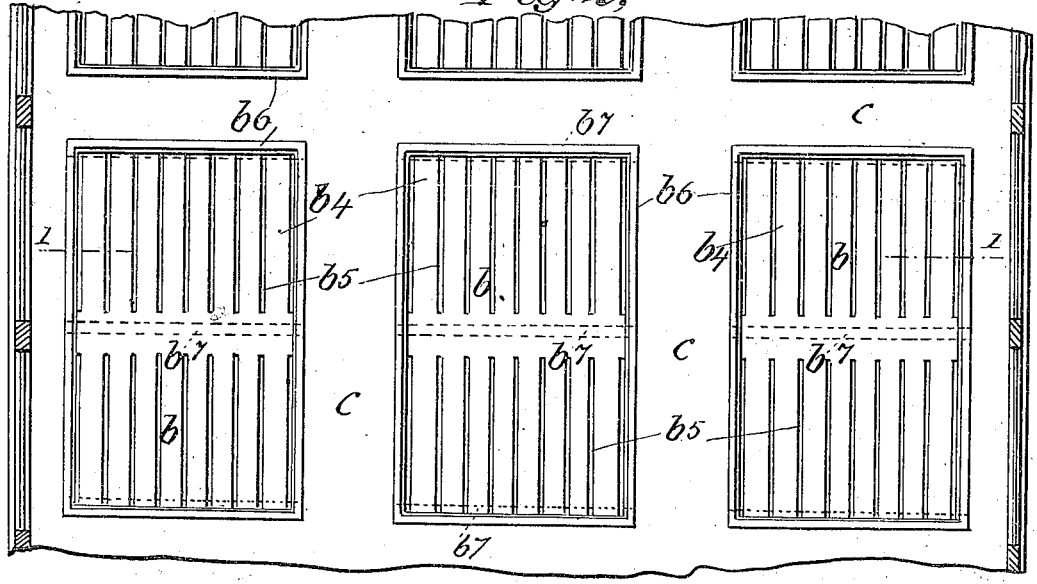

Figure 1 is a transverse section of a greenhouse made according to our invention, and Fig. 2 a sectional plan view of a part thereof.

In the practice of our invention we construct a greenhouse of the usual form, which, as shown in the drawings, comprises side walls $a$, the bottom portions of which are composed of concrete and on which is placed the usual roof construction $a^2$, comprising the usual or any preferred framework covered with glass or provided with glass panels, and the top portions of the walls $a$ are also composed of a suitable framework $a^3$, provided with glass panels in the usual manner. Within the interior of the greenhouse are placed the usual longitudinal benches $b$, three of which are shown, and said benches increase in height from one side of the house to the other. The benches $b$, which run longitudinally of the house and are separated by lanes, platforms, or walks, are composed of separate bents $b^7$, each of the latter being rectangular in form and comprising separate posts or upright members $b^2$ and transverse top members or girders $b^3$, on which are placed the table or floor members $b^4$, provided with parallel narrow slots or openings $b^5$, and each separate bench or table is provided with a raised border or retaining-wall $b^6$, and all this construction is composed of reinforced concrete. Between the separate benches which run longitudinally of the greenhouse are placed horizontal platforms, lanes, or walks $c$, and similar platforms $c$ are placed between the ends of the separate benches, and said platforms are supported by lugs or projections $c^2$, formed on the posts or upright members $b^2$, and said platforms are also composed of reinforced concrete. The floor members $b^4$ and the upright retaining-walls or borders $b^6$ form receptacles or containers in which is placed earthy material, in which the plants or flowers are planted, and the object of the narrow slots or openings $b^5$ is to provide means for draining said earthy material in the manner of other constructions of this class.

The greenhouse may be provided with any suitable flooring $a^4$, or the said house may be made without any flooring, if desired, and the space beneath the benches or bents beneath the platforms $c$ may be used for the usual or any desired purpose, such as a water-reservoir, furnace, &c.

It will be understood that the greenhouse may be of any desired shape and dimensions, and the superstructure thereof may be formed in the usual or any preferred manner, our invention being limited to the construction of the benches or tables by which the plants are supported.

Having fully described our invention, what we claim as new, and desire to secure by Letters Patent, is—

1. A greenhouse provided with a plurality of benches comprising tables having suitable supports and provided with bottoms having parallel slots or openings therein and having surrounding retaining-walls, said benches being separated longitudinally and transversely by raised platforms or walks arranged below said benches, all of said parts being composed of reinforced concrete and being of monolithic construction.

2. A greenhouse provided with longitudinally-arranged benches comprising retaining-tables provided with bottoms having slots or openings therein and also provided with surrounding retaining-walls, said benches being increased in height from one side of the greenhouse to the other and being separated longitudinally and transversely by platforms or walks arranged below said tables, all of said parts being composed of reinforced concrete.

3. A greenhouse provided with longitudinally-arranged benches having suitable supports and provided with bottoms having slots or openings therein and surrounding retaining-walls, said benches being separated longitudinally and transversely by platforms or walks arranged below the top thereof, and said benches being also increased in height from one side of the greenhouse to the other, all of said parts being composed of reinforced concrete.

In testimony that we claim the foregoing as our invention we have signed our names, in presence of the subscribing witnesses, this 11th day of July, 1906.

JOHN WILSON.
SAMUEL O. HOYT.

Witnesses:
F. A. STEWART,
C. E. MULREANY.